US005662435A

United States Patent [19]

Sherman

[11] Patent Number: 5,662,435

[45] Date of Patent: Sep. 2, 1997

[54] CUTTER BIT

[75] Inventor: Michael M. Sherman, Lockport, N.Y.

[73] Assignee: Oldham Saw Co., Inc., Burt, N.Y.

[21] Appl. No.: 514,770

[22] Filed: Aug. 14, 1995

[51] Int. Cl.[6] .......... B23C 5/12

[52] U.S. Cl. .......... 407/31; 407/56; 144/236

[58] Field of Search .......... 407/28, 29, 30, 407/31, 32, 33, 34, 35, 53, 54, 55, 56, 57, 58; 409/132; 144/218, 134 R, 134 A, 236, 237

[56] References Cited

U.S. PATENT DOCUMENTS

| | | | |
|---|---|---|---|
| 385,325 | 6/1888 | Shimer . | |
| 1,432,580 | 10/1922 | Vauclain et al. | 407/31 |
| 2,149,618 | 3/1939 | Misuraca | 144/218 |
| 2,297,611 | 9/1942 | Drummond | 29/103 |
| 2,429,822 | 10/1947 | Kelly | 407/31 X |
| 2,710,635 | 6/1955 | Alexander | 144/162 |
| 2,985,206 | 5/1961 | Letts | 144/218 |
| 3,882,912 | 5/1975 | Sybertz | 407/33 X |
| 3,913,196 | 10/1975 | Maday | 29/103 |
| 3,991,454 | 11/1976 | Wale | 29/105 |
| 4,068,688 | 1/1978 | Benson | 407/31 X |
| 4,610,285 | 9/1986 | Derivaz | 144/231 |

FOREIGN PATENT DOCUMENTS

| | | | |
|---|---|---|---|
| 49138 | 7/1911 | Austria | 144/236 |

*Primary Examiner*—Daniel W. Howell
*Assistant Examiner*—Henry W. H. Tsai
*Attorney, Agent, or Firm*—Sand & Sebolt

[57] ABSTRACT

A cutter bit includes a body integrally formed with a mounting shank. The body is formed with a pair of chip boxes having an arcuate surface and a planar surface with a cutting knife mounted to each planar surface. A plurality of equally spaced recesses are formed in the body to reduce cutter bit weight, and to promote heat transfer from the cutter bit to the surrounding atmosphere. Adjacent recesses form annular ribs which extend circumferentially around the body from one cutting knife to the arcuate surface adjacent the other cutting knife. The arcuate ribs operate as heat exchanger fins by substantially increasing the outer surface area of the cutter bit thereby substantially increasing the rate of heat transfer from the cutter bit to the surrounding atmosphere. In other embodiments of the invention, the annular ribs are inclined to assist in removing chips from adjacent the area adjacent the cutting area to reduce chip load on the router bit, and assure that the user has a clear view of the cutting action. Alternatively, the annular ribs may be attached to form a helix extending circumferentially around the body to assist in chip removal.

18 Claims, 3 Drawing Sheets

CUTTER BIT

BACKGROUND OF THE INVENTION

1. Technical Field

The invention relates generally to an improved cutter bit. More particularly, the invention relates to shaft mounted rotary cutter bits of the type mounted in rotary woodworking machines. Specifically, the invention relater to multi-edged rotary cutting bits having reduced weight and increased cooling capacity during operation.

2. Background Information

It is customary in building construction, as well as the construction of furniture and cabinetry to impart decorative profiles upon the wood. Moreover, many joints are created by imparting a variety of profiles on the wood to create stronger joints, as well as to provide increased surface areas for glue contact at the joint. Regardless of the reasons of imparting a profile on the wood, the profile may be created in one of two methods. Hand planes may be utilized, which planes have a cutting knife shaped with a negative of the profile to be imparted on the wood. However, such planes are expensive, inaccurate and require significant skill to utilize. As such, many power tools have been specifically designed to impart a desired profile onto a workpiece while existing tools have been modified to allow those tools to also impart the desired profile.

While many such tools exist, routers are by far the most prevalent. Routers include a motor which rotates a chuck at a predetermined or variable speed. When the router operator wishes to impart a given profile onto a workpiece, the shank of a router bit having the desired profile is installed into the chuck. When the motor is activated, the router bit will rotate with each blade of the bit removing material from the workpiece creating the desired profile. Other cutting tools, such as shapers, provide a similar effect with only the connection between the cutter bit and tool varying.

As woodworking becomes increasingly popular in the hobby market, and competition increases in the industrial market, a significant number of cutter bits, each presenting a corresponding profile, have been developed. Additionally, as the size of routers continues to increase, cutter bits having increasingly complicated and larger profiles are being manufactured. Moreover, a number of bits have been introduced which present multiple profiles depending upon which portion of the bit is in contact with the workpiece.

When a cutter bit is in use, the router motor is loaded in a variety of ways. As the cutter bit impinges upon the workpiece and material is removed to create the desired profile, the resistance resulting from the cutting action loads the router motor. Additionally, the weight of the cutter bit itself adds significant load to the router motor. While the load is a result of cutting action may be substantially reduced by assuring that the cutter bit remains sharp, and has correct bevel angles to remove material chips, the second load, resulting from cutter bit weight, may be reduced only by reducing the weight of the cutter bit.

This second load, which results from cutter bit weight, is of primary concern herein. This load is insignificant when the cutter bit is small, or when the majority of the cutter bit mass is very near the cutter bit axis of rotation. However, for larger, or more complicated profiles such as multi-profile cutter bits, the cutter bit mass can be significant, with a significant portion thereof being positioned substantially away from the axis of rotation of the cutter bit thereby substantially increasing router motor load as a result of centrifugal force.

One method of reducing cutter bit loading which has been used in the past is to remove material from the body of the cutter bit by drilling holes through non-essential portions of the cutter bit body. While this method of weight reduction is presumably adequate for the purpose for which it was intended, it substantially reduces cutter bit strength, and can add significant expense to the manufacture of cutter bits for use with router motors.

Another problem associated with larger and more complicated cutter bits for use with router motors is heat build-up within the router bit body. Specifically, when a cutter bit is utilized to impart profiles upon a workpiece at high volume, or alternatively when the workpiece is extremely hard, significant heat may build up in the router bit substantially reducing router bit life. While the holes drilled through the router body as discussed above operate to reduce heat within the router body to some degree, the need exists for a method of removing heat from a router bit in an effort to assure that the cutting tool remains at relatively constant temperature during stressful routing operations.

Additionally, even when a cutter bit is sharp, and appropriately beveled for chip removal, the cutter bit may nonetheless be loaded with material chips substantially increasing forces felt by the router motor and decreasing the effectiveness of the cutter bit. Additionally, when chips remain positioned adjacent the cutter bit, it is difficult for the user to see the cutting operation.

Thus, the need exists for a cutter bit having a body with substantially reduced weight, and which significantly increases heat transfer to the surrounding atmosphere during operation. The need further exists for a cutter bit which assists in removing the chips from adjacent the cutting area, and which quickly unloads chips to the surrounding work surface.

SUMMARY OF THE INVENTION

Objectives of the invention include providing a lightweight cutter bit.

A further objective is to provide a cutter bit wherein the amount of weight positioned away from the axis of rotation of the cutter bit is substantially reduced.

Yet another objective is to provide a cutter bit, the shape of which assists the transfer of heat from the cutter bit body to the surrounding atmosphere.

A still further objective is to provide a cutter bit having a body with alternating annular bosses and recesses extending circumferentially between the knife edges.

Yet another objective is to provide a cutter bit which quickly removes chips from adjacent the cutting area.

A further objective is to provide such a cutter bit which is of simple construction, which achieves the stated objectives in a simple, effective and inexpensive manner, and which solves problems and satisfies needs existing in the art.

These and other objectives and advantages of the invention are obtained by the improved cutter bit, the general nature of which may be stated as including a body formed with an axial length; at least one cutting knife carried by the body; mounting means adapted for mounting the cutter bit to a motor; a plurality of arcuate ribs extending at least partially around the body and terminating at the cutting knife; and a plurality of recesses formed in, and extending circumferentially around the body and located intermediate the ribs.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
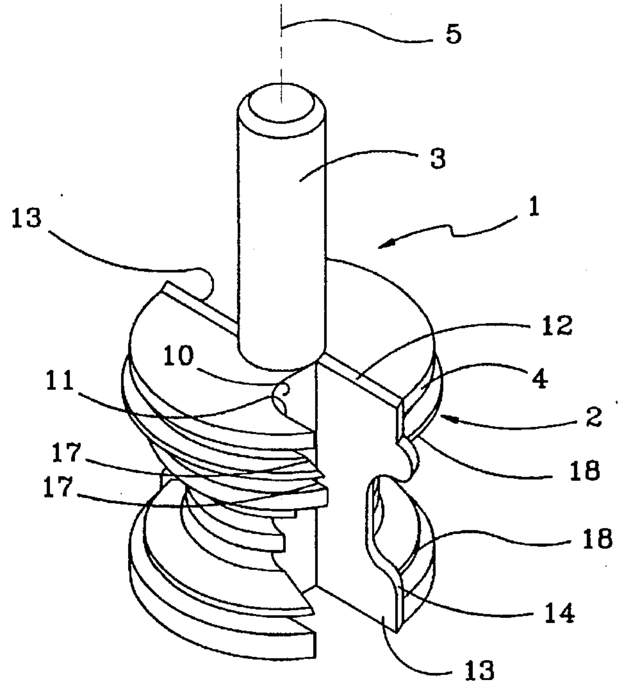
FIG. 1 is a perspective view of the cutter bit of the present invention.

The improved cutter bit of the present invention is indicated generally at 1, and is particularly shown in FIG. 1. Cutter bit 1 includes a body 2 and a mounting shank 3 extending outwardly from body 2. Body 2 is integrally formed with mounting shank 3.

Body 2 is formed with an outer surface 4 and an axis of rotation 5. Additionally, body 2 is formed with a pair of opposing chip boxes 10 having an arcuate surface 11 and a planar surface 12. One cutting knife 13 is attached to body 2 adjacent each planar surface 12. Cutting knives 13 are formed with a profile edge 14 for removing material from the workpiece.

Figure 2:
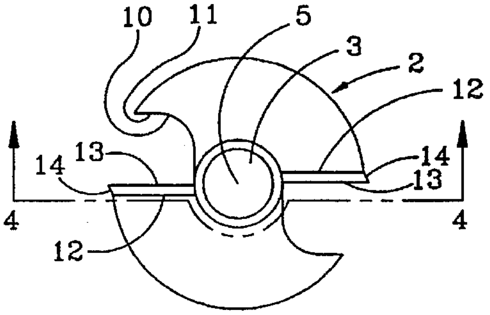
FIG. 2 is a top plan view of the cutter bit of the present invention.
Figure 3:
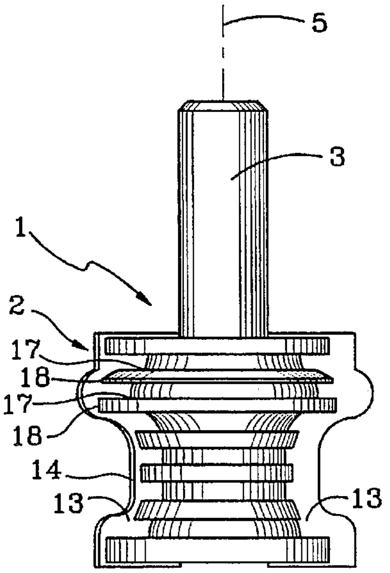
FIG. 3 is a side elevational view of the cutter bit of the present invention.
Figure 4:
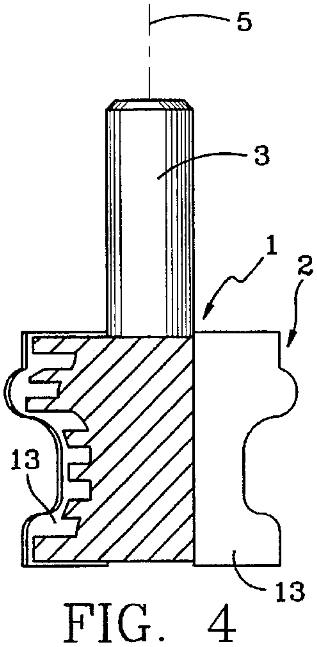
FIG. 4 is a sectional view of the cutter bit of the present invention taken substantially along line 4—4, FIG. 2.
Figure 5:
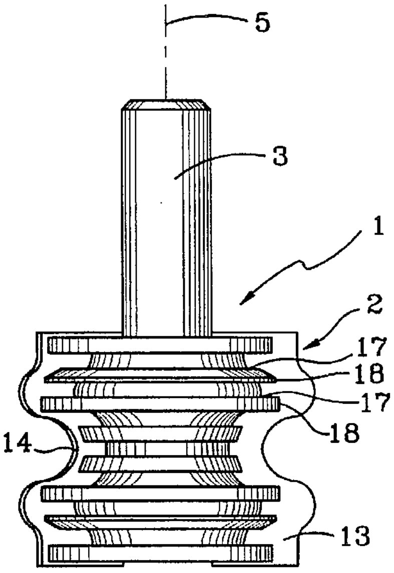
FIG. 5 is a side elevational view of the cutter bit of the present invention with a different knife profile.

In accordance with one of the main features of the present invention, and referring specifically to FIGS. 1–3, a plurality of equally spaced arcuate recesses 17 are formed in body 2 whereby each pair of adjacent recesses define an arcuate rib 18 circumferentially extending around body 2 of cutter bit 1. Annular recesses 17 extend inwardly from outer surface 4 toward axis of rotation 5 a distance in the range of from ⅕ to ⅗ the distance between outer surface 4 and axis of rotation 5. More specifically, a plurality of equally spaced recesses 17 are formed circumferentially around axis of rotation 5 along the entire axial length of body 2 with arcuate ribs 18 also extending circumferentially around body 2 and located intermediate recesses 17. Each rib 18 begins at one cutting knife 13 adjacent the associated profile edge 14, and extends circumferentially around body 2 and terminates at arcuate surface 11 of chip box 10 adjacent the other cutting knife 13. While annular ribs 18 may be attached to cutting knives 13 by any convenient attachment means, in the preferred embodiment cutting knives 13 are welded to annular ribs 18.

The lack of material within annular recesses 17 substantially reduces the weight of cutter bit 1 when compared to conventional cutter bits thereby permitting cutter bit 1 to be utilized with router motors having smaller horsepower ratings, and similarly reducing the loads associated with cutting operations as a result of cutter bit weight. Additionally, the majority of material removed from body 2 of cutter bit 1 has been removed from body 2 at a point radially outwardly from the axis of rotation 5 of cutter bit 1. Removal of weight in this area further reduces the load on the router motor as a result of centrifugal force. Similarly, inasmuch as ribs 18 contact cutting knives 13 adjacent profile edge 14, and are equally spaced along the length of body 2, ribs 18 provide sufficient resistance to deflection of cutting knives 13.

While annularly extending recesses 17 substantially reduce the weight of cutter bit 1, the surface area of outer surface 4 of body 2 is also substantially increased. The increased area of outer surface 4 of body 2 permits an increased rate of heat transfer from cutter bit 1 to the surrounding atmosphere when cutter bit 1 is in use. Specifically, inasmuch as the ambient atmosphere contacts more surface area of body 2, heat stored in cutter bit 1 as a result stressful routing operations will more quickly be transferred to the surrounding atmosphere as ribs 18 of cutter bit 1 essentially operate as heat exchanging fins providing increased surface area contacting the surrounding atmosphere.

Figure 7:
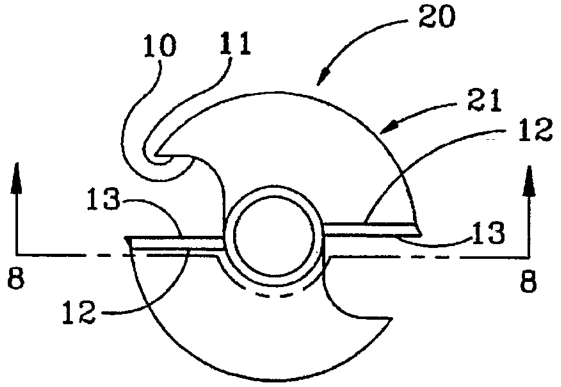
FIG. 7 is a top plan view of the cutter bit shown in FIG. 6.
Figure 6:
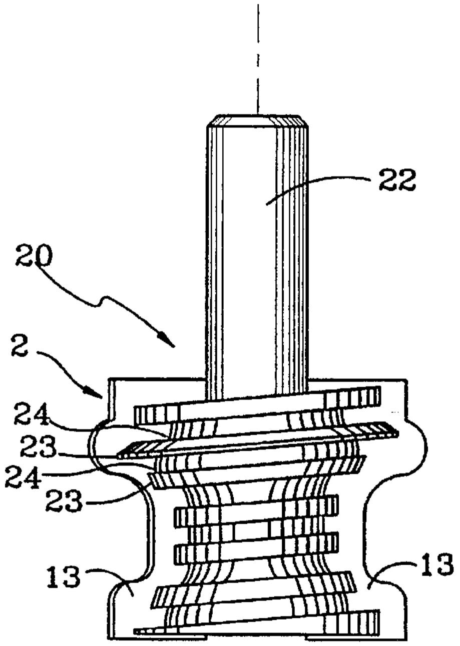
FIG. 6 is a side elevational view of the cutter bit of a second embodiment of the present invention.
Figure 8:
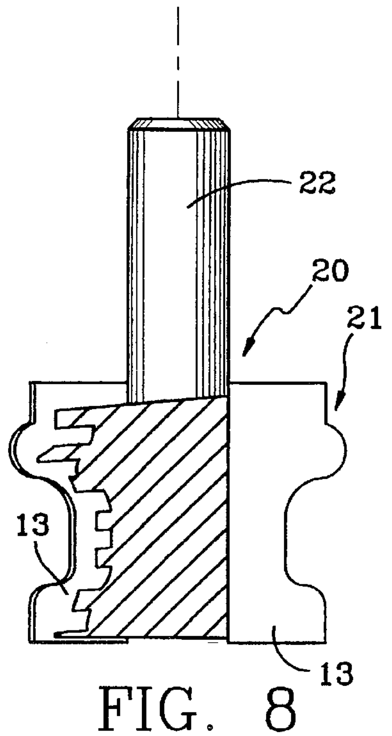
FIG. 8 is a sectional view of the cutter bit of the second embodiment of the present invention taken substantially along line 8—8, FIG. 7.

An improved cutter bit of a second embodiment of the present invention is indicated generally at 20, and is shown particularly in FIGS. 6–8. Cutter bit 20 includes a body 21 and a mounting shank 22 extending outwardly from body 21. Body 21 is similar to body 2 in that it is formed with a pair of opposing chip boxes 10 having arcuate surface 11 and a planar surface 12. Additionally, one cutting knife 13 is attached to body 20 adjacent each planar surface 12.

However, in accordance with one of the main features of the second embodiment of the present invention, a helical rib 23 extends circumferentially around body 21 of cutter bit 20. Helical rib 23 defines a helical recess 24. Helical rib 23 spirals circumferentially around body 21 in a clockwise direction and is formed with constant rate of incline over each chip box 10. Specifically, helical rib 23 beginning at one cutting knife 13, extends circumferentially around body 21 and terminates at arcuate surface 11 at chip box 10 adjacent the other cutting knife 13.

Cutter bit 20 offers all of the advantages of cutter bit 1, with the added advantage that as cutter bit 20 rotates, it will operate to pull material chips away from the work surface, and towards the router motor. If cutter bit 20 is mounted in a router motor which is to be used freehand, annular rib 23 will pull material chips away from the cutting edge and toward the router motor thereby assuring that the user has a clear view of the cutting edge and the workpiece adjacent the cutting edge. Alternatively, if cutter bit 20 is mounted within a router motor inverted beneath a router table, chips are pulled downwardly below the router table surface, and once again away from the cutting edge and the workpiece to assure that the user has a clear view of the cutting action. As is apparent from a review of FIGS. 6–8, helical rib 23 may be inclined at any of a variety of angles, but in the preferred embodiment, helical rib 23 is inclined in the range of from 2 to 15 degrees, and preferably in the range of from 4 to 10 degrees. Additionally, while a single helix may be utilized as shown in the preferred embodiment, multiple helixes may be positioned circumferentially around body 21 of cutter bit 20 without departing from the spirit of the present invention.

Figure 9:
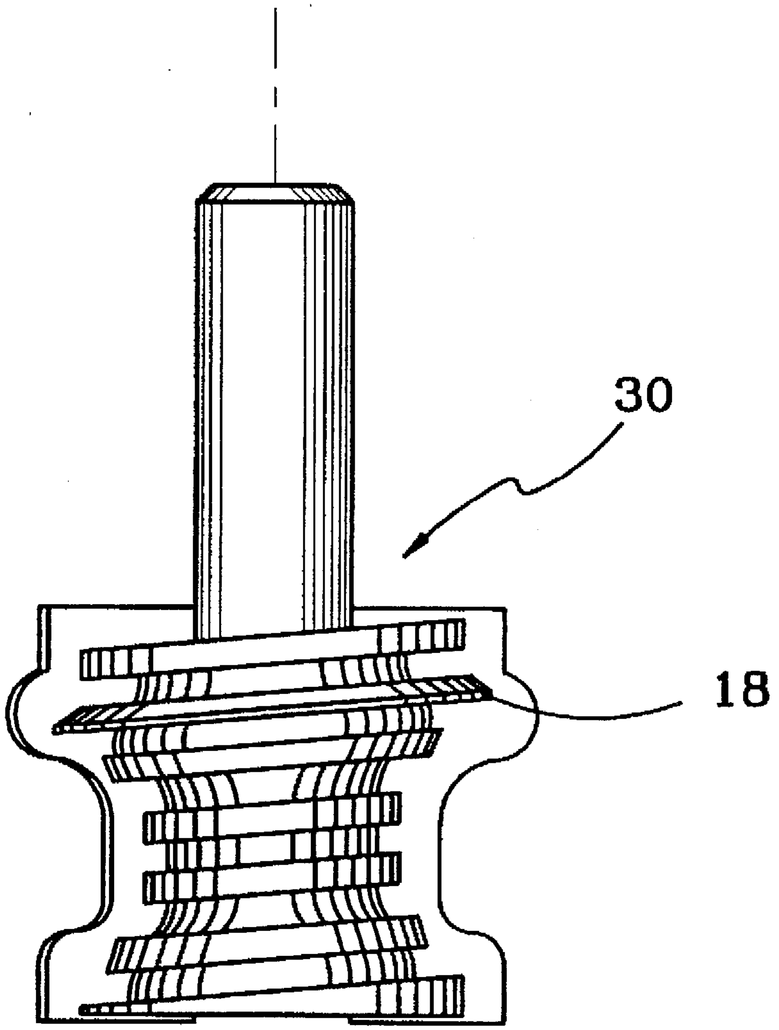
FIG. 9 is a side elevational view of the cutter bit of a third embodiment of the present invention.

A third embodiment of the present invention is indicated generally at 30, and is shown particularly in FIG. 9. Cutter bit 30 is identical to cutter bit 1 except arcuate ribs 18 are inclined to assist in chip removal, substantially similar to the manner in which helical rib 23 assists in chip removal in the second embodiment of the present invention. Again, inclined arcuate ribs 18 of the third embodiment of the invention may be inclined in the range of from 2 to 15 degrees, and preferably are inclined in the range of from 4 to 10 degrees relative to the horizontal.

In summary, ribs 18 of cutter bit 1 provide strength to cutting knives 13 against deflection with the inclusion of recesses 17 substantially reducing the weight of cutter bit 1 thereby substantially reducing the load on the associated router motor. Additionally, arcuate ribs 18 operate as heat exchanger fins to substantially increase the rate of heat transfer from cutter bit 1 to the surrounding atmosphere.

Accordingly, the improved cutter bit is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cutter bit is constructed and used, the characteristics of the construction, and the advantageous, new and useful results obtained; the new and useful structures, devices, elements, arrangements, parts and combinations, are set forth in the appended claims.

I claim:

1. A rotary cutter bit for imparting a profile to a workpiece comprising:

- a body formed with an axial length;
- at least one cutting knife formed with a continuous profile edge carried by the body;
- a shank integrally formed with the body adapted for mounting the cutter bit to a motor;
- a plurality of arcuate ribs integrally formed with the body and extending at least partially around the body and terminating at the cutting knife whereby the at least one cutting knife is attached to each of the plurality of arcuate ribs; and
- a plurality of recesses formed in, and extending circumferentially around the body and located intermediate the ribs.

2. A rotary cutter bit as defined in claim 1 in which each rib terminates at the cutting knife adjacent the profile edge.

3. A rotary cutter bit as defined in claim 2 in which the body is formed with an outer surface and an axis of rotation; and in which each recess extends inwardly from the outer surface toward the axis of rotation.

4. A rotary cutter bit as defined in claim 3 in which the ribs are substantially parallel.

5. A rotary cutter bit as defined in claim 4 in which the ribs are equally spaced along the axial length of the body.

6. A rotary cutter bit as defined in claim 5 in which each recess extends into the body a distance in the range of from ⅕ to ⅗ the distance between the outer surface and the axis of rotation.

7. A rotary cutter bit as defined in claim 1 in which there are a plurality of cutting knives, each of which is formed with a profile edge; in which a chip box is associated with each cutting knife; and in which each annular rib extends from one cutting knife to the chip box adjacent the other cutting knife.

8. A rotary cutter bit as defined in claim 7 in which the cutting knife is formed with a profile edge; and in which each arcuate rib joins the cutting knife intermediate the axis of rotation and the profile edge.

9. A rotary cutter bit as defined in claim 8 in which each arcuate rib is welded to a cutting knife.

10. A rotary cutter bit as defined in claim 3 in which the mounting means is a shank extending outwardly from the body.

11. A rotary cutter bit as defined in claim 10 in which the shank is formed with an axis of rotation, and in which the axis of rotation of the shank is coaxial with the axis of rotation of the body.

12. A rotary cutter bit as defined in claim 10 in which the shank has an axis of rotation; and in which a plurality of arcuate ribs extend substantially perpendicular to the shank axis.

13. A rotary cutter bit as defined in claim 10 in which the shank has an axis of rotation; and in which the ribs are angularly oriented relative to the axis of rotation.

14. A rotary cutter bit as defined in claim 13 in which the angular ribs are inclined in the range of from 2 degrees to 15 degrees.

15. A rotary cutter bit as defined in claim 13 in which the angular ribs are inclined in the range of from 4 degrees to 10 degrees.

16. A rotary cutter bit as defined in claim 10 in which the shank is formed with an axis of rotation, and in which the plurality of arcuately extending ribs form a helix extending circumferentially around the body along the axial length of said body.

17. A rotary cutter bit as defined in claim 16 in which the arcuate ribs are inclined in the range of from 2 degrees to 15 degrees.

18. A rotary cutter bit as defined in claim 16 in which the arcuate ribs are inclined in the range of from 4 degrees to 10 degrees.

* * * * *